(12) United States Patent
Maliverney et al.

(10) Patent No.: US 9,150,755 B2
(45) Date of Patent: Oct. 6, 2015

(54) SILICONE COMPOSITION THAT CAN BE CROSS-LINKED BY MEANS OF DEHYDROGENATIVE CONDENSATION IN THE PRESENCE OF A CARBENE-TYPE CATALYST

(75) Inventors: Christian Maliverney, Saint Julien sur Bibost (FR); Laurent Saint-Jalmes, Vourles (FR)

(73) Assignee: BLUESTAR SILICONES FRANCE SAS, Lyons (FR)

( * ) Notice: Subject to any disclaimer, the term of this patent is extended or adjusted under 35 U.S.C. 154(b) by 0 days.

(21) Appl. No.: 14/130,746

(22) PCT Filed: Jul. 6, 2012

(86) PCT No.: PCT/FR2012/000270
§ 371 (c)(1),
(2), (4) Date: Apr. 28, 2014

(87) PCT Pub. No.: WO2013/004926
PCT Pub. Date: Jan. 10, 2013

(65) Prior Publication Data
US 2014/0377569 A1    Dec. 25, 2014

(30) Foreign Application Priority Data

Jul. 7, 2011 (FR) ..................................... 11 56186

(51) Int. Cl.
| | |
|---|---|
| C08G 77/08 | (2006.01) |
| C09D 183/06 | (2006.01) |
| C08L 83/04 | (2006.01) |
| C09D 183/04 | (2006.01) |
| C08F 4/00 | (2006.01) |
| C08J 9/00 | (2006.01) |
| C08J 9/02 | (2006.01) |
| C08G 77/12 | (2006.01) |
| C08G 77/16 | (2006.01) |

(52) U.S. Cl.
CPC ................ *C09D 183/06* (2013.01); *C08F 4/00* (2013.01); *C08G 77/08* (2013.01); *C08J 9/0023* (2013.01); *C08J 9/02* (2013.01); *C08L 83/04* (2013.01); *C09D 183/04* (2013.01); *C08G 77/12* (2013.01); *C08G 77/16* (2013.01); *C08J 2201/026* (2013.01); *C08J 2383/04* (2013.01); *C08J 2383/05* (2013.01); *C08J 2383/06* (2013.01); *Y10T 428/31663* (2015.04)

(58) Field of Classification Search
None
See application file for complete search history.

(56) References Cited

U.S. PATENT DOCUMENTS

| | | | |
|---|---|---|---|
| 4,262,107 A | | 4/1981 | Eckberg |
| 2007/0027286 A1 | * | 2/2007 | Blanc-Magnard et al. ..... 528/31 |
| 2011/0160454 A1 | | 6/2011 | Yoo et al. |

FOREIGN PATENT DOCUMENTS

| | | | | |
|---|---|---|---|---|
| EP | 1167424 | | 1/2002 | |
| FR | 341232 | | 8/1904 | |
| FR | 603563 | | 4/1926 | |
| FR | 1209131 | | 2/1960 | |
| FR | 2806930 | | 10/2001 | |
| FR | 2856690 | | 12/2004 | |
| FR | 2864543 | | 7/2005 | |
| FR | 2900153 | | 10/2007 | |
| WO | WO2013/101477 | * | 7/2013 | ........... C09D 183/04 |

OTHER PUBLICATIONS

Nelson et al. "Quantifying and understanding the electronic properties of N-heterocyclic carbenes" Chem. Soc. Rev. 2013, 42, 6723-6753.*
Wolfgang A. Herrmann "N-Heterocyclic Carbenes: A New Concept in Organometallic Catalysts" Angew. Chem. Int. Ed. 2002, 41, 1290-1309.*
Grasa et al. "N-Heterocyclic Carbenes as Versatile Nucleophilic Catalysts for Transesterification/Acylation Reactions" Org. Lett. 2002, 4(21), 3583-3586.*
Coulembier et al. "Alcohol Adducts of N-Heterocyclic Carbenes: Latent Catalysts for the Thermally-Controlled Living Polymerization of Cyclic Esters" Macromolecules 2006, 39, 5617-5628.*
International Search Report for PCT/FR2012/000270 Mailed Sep. 12, 2012.

* cited by examiner

*Primary Examiner* — Robert S Loewe
(74) *Attorney, Agent, or Firm* — Miles & Stockbridge P.C.

(57) ABSTRACT

The invention relates to a silicone composition comprising components bearing ≡SiH/≡SiOH groups, which can be polymerized/cross-linked by means of a dehydrogenative condensation reaction in the presence of a carbene-type catalyst in solution.

15 Claims, 1 Drawing Sheet

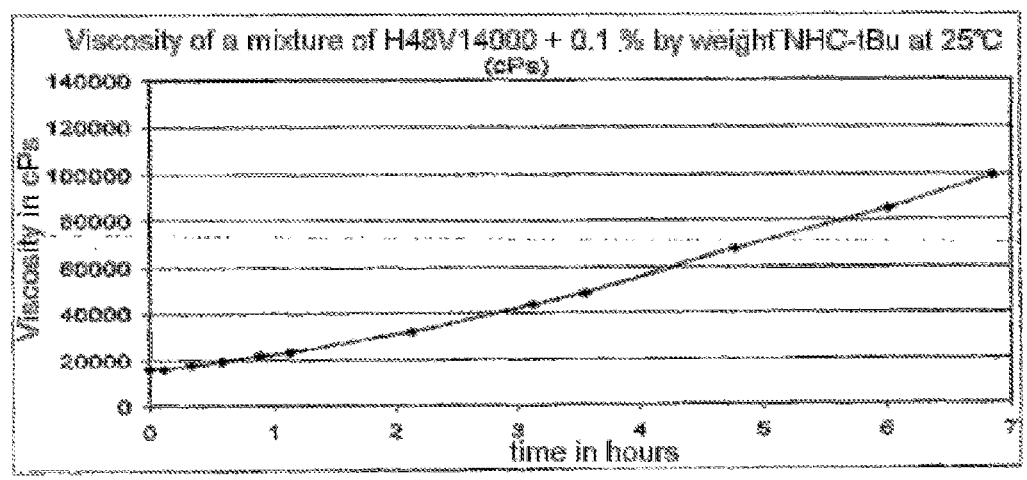

SILICONE COMPOSITION THAT CAN BE CROSS-LINKED BY MEANS OF DEHYDROGENATIVE CONDENSATION IN THE PRESENCE OF A CARBENE-TYPE CATALYST

CROSS REFERENCE TO RELATED APPLICATIONS

This application is a §371 National Stage Application of PCT/FR2012/000270, filed Jul. 6, 2012, which claims priority to French Application No. 11 56186, filed Jul. 7, 2011.

BACKGROUND OF THE INVENTION

1. Field of the Invention

The present invention relates to the field of the catalysis of dehydrogenative condensation reactions enabling the polymerization/crosslinking of silicone. The reactive species involved are monomers, oligomers, and/or polymers of polyorganosiloxane nature.

2. Description of Related Art

The reactive units concerned in these species are ≡SiH units and ≡SiOH units. Dehydrogenative condensation between these reactive silicone units results in the formation of ≡Si—O—Si≡ bonds and in the release of hydrogen gas.

This dehydrogenative condensation is an alternative to the polymerization/crosslinking routes known in the silicone field, namely the polyaddition route by reaction between ≡SiH and ≡Si-alkenyl(vinyl) units, and also the polycondensation route by reaction between ≡SiOR and ≡SiOR units (with R=alkyl). All these polymerization/crosslinking routes result in silicone products which are more or less polymerized and more or less crosslinked, which can constitute products that can be used in many applications: adhesives, sealing products, pointing products, adhesion primers, release coatings, foams, etc.

It is known according to French patent FR-B-1 209 131 that a reaction between a silanol $Ph_2Si(OH)_2$ and a said organosiloxane [$(Me_2HSi)_2O$] with Me=methyl and Ph=phenyl, by means of dehydrogenative condensation, can be catalyzed by a chloroplatinic acid ($H_2PtCl_6.6H_2O$).

It is also known practice to use a rhodium complex ($RhCl_3[(C_8H_{17})_2S]_3$), for example as mentioned in U.S. Pat. No. 4,262,107, a platinum complex such as the Karstedt catalyst, or metal catalysts based on platinum, rhodium, palladium or iridium. As iridium-based catalyst, mention may be made of the following compounds: $IrCl(CO)(TPP)_2$, $Ir(CO)_2$ (acac), $IrH(Cl)_2(TPP)_3$, $[IrCl(Cyclooctene)_2]_2$, $IrI(CO)(TPP)_2$ and $IrH(CO)(TPP)_3$, in which formulae TPP signifies a triphenylphosphine group and acac an acetylacetonate group.

Other examples are catalysts such as amines, colloidal nickel or dibutyltin dilaurate (see the book by Noll, "Chemistry and technology of silicones", page 205, Academic Press, 1968-2nd edition). However, the alkyltin-based catalysts, although very effective, usually colorless, liquid and soluble in silicone oils, have the drawback of being toxic (CMR2 toxic for reproduction).

Other catalysts, such as boron derivatives of tris(pentafluorophenyl)borane type, are described in French patent application FR-A-2 806 930.

U.S. Pat. No. 4,262,107 describes a silicone composition comprising a polydimethyldisiloxane comprising silanol ends, a crosslinking agent consisting of a polyorganosiloxane comprising ≡SiH units in the chain and comprising trimethylsilyl ends and a catalyst consisting of a rhodium complex ($RhCl_3[(C_8H_{17})_2S]_3$). This silicone composition that can be crosslinked by means of dehydrogenative condensation in the presence of a rhodium complex can be used for producing release coatings on flexible supports such as paper and plastic or metal films. The crosslinking is carried out at a temperature of 150° C.

European patent application EP-A-1 167 424 describes the obtaining of linear silicone block copolymers by means of the dehydrogenative condensation of a polydimethylsiloxane comprising silanol ends and of a polyorganosiloxane comprising aromatic groups and comprising ≡SiH ends in the presence of a metal catalyst which may be based on platinum, rhodium, palladium or iridium, platinum being particularly preferred.

French patent application FR-A-2 806 930 describes the use of boron derivatives of tris(pentafluorophenyl)borane type as a thermoactivatable catalyst for dehydrogenative condensation between a polyorganosiloxane comprising ≡SiH units and a polyorganosiloxane comprising ≡SiOH end units. Such silicone compositions that can be crosslinked by means of dehydrogenative condensation in the presence of Lewis acids of boron derivative type can be used for the manufacture of release coatings on flexible supports, in particular on paper, and also in the manufacture of crosslinked silicone foams in which the release of hydrogen and the quality of the crosslinking network are controlled.

It emerges from this review of the prior art, relating to the catalysis of dehydrogenative condensation between a polyorganosiloxane comprising a siloxyl ≡SiOH unit and a polyorganosiloxane comprising a siloxyl ≡SiH unit, that there is a significant need to:

1) find new nontoxic catalysts,
2) reduce the catalyst activation temperature, and
3) limit the side reactions.

Application FR 03 41232 relates to a process for preparing a polyorganosiloxane by polymerization via ring opening and/or redistribution of polyorganosiloxane, in the presence of a catalyst (or initiator) consisting of at least one nucleophilic carbene.

Application FR 06 03563 relates to a process for polycondensation of a polyorganosiloxane between at least one ≡SiOH unit and at least one ≡SiOR unit also using catalysts with a carbene structure.

However, the carbene catalysts described in the abovementioned two applications are unstable and must generally be either used in a crystalline form, or generated in situ from precursor salts. As it happens, carbenes are highly reactive species that degrade in the open air, which implies storing them and handing them under an inert atmosphere.

SUMMARY

Thus, one of the objectives of the present invention is to provide a silicone composition comprising components bearing ≡SiH and —SiOH groups, which can be polymerized/crosslinked by means of a dehydrogenative condensation reaction, in the presence of a novel catalytic composition, which is stable in the open air for several months and, consequently, easily transportable, thereby enabling easy industrial use without requiring additional steps to generate it in situ.

Another objective of the present invention is to provide a novel nontoxic catalyst for dehydrogenative condensation of organopolysiloxanes bearing ≡SiH and —SiOH groups, that is inexpensive to synthesize since it does not have the constraints of the prior art catalysts with a carbene structure, in particular associated with their instability, and requiring synthesis in an anhydrous medium and/or a purification step by sublimation with very low yields.

Another objective of the present invention is to provide a process for polymerizing and/or crosslinking a composition of the type of that mentioned in the stating of the objectives above, this process having to be rapid, economic and effective in terms of quality of the final product obtained.

Another objective of the invention is to provide a process for producing at least one coating on a support (preferably a flexible support), consisting in using the crosslinking/polymerization process or the composition mentioned above.

Another objective of the invention is to provide a process for producing at least one article made of crosslinked silicone foam, consisting in using the abovementioned crosslinking/polymerization process and/or the composition mentioned above in the objectives, this process making it possible to control the volume of hydrogen gas given off and the quality of the elastomer formed.

It is understood that the term "elastomer" is taken in the sense given to it in the silicone field and which describes the product obtained after curing a silicone composition without any implications regarding its elasticity properties.

In order to achieve this objective, the applicant has, to its credit, demonstrated, entirely surprisingly and unexpectedly, that the use of carbenes that are stable in alcoholic solution makes it possible to catalyze the organopolysiloxane dehydrogenative condensation reaction for the crosslinking of elastomer compositions, for example for obtaining silicone foams, sealants or coated supports.

Thus, the invention relates first of all to a siloxane composition X, which can be polymerized or crosslinked by means of dehydrogenative condensation, comprising:
  at least one organosiloxane monomer, oligomer and/or polymer B having, per molecule, at least one ≡SiH reactive unit;
  at least one organosiloxane monomer, oligomer and/or polymer C having, per molecule, at least one ≡SiOH reactive unit;
  a catalytic composition Y' comprising:
    a) a catalytically effective amount of at least one polycondensation catalyst A which is a carbene of formula (I) below:

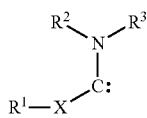
(I)

with:
  the symbol X being chosen from the group consisting of the following atoms or groups: —O—, —S—, —N(R)— and —P(R)— with R being a $C_1$-$C_{30}$ group,
  $R^1$, $R^2$ and $R^3$ being identical or different, optionally substituted, $C_1$-$C_{30}$ groups optionally comprising one or more atoms chosen from the group consisting of: S, P, Si, N and O, and
  the symbols X, $R^1$, $R^2$ and $R^3$ taken in pairs can form a 5-, 6- or 7-membered ring, and
  b) at least one solvent comprising at least one alcohol G; optionally at least one polyorganosiloxane resin D; and optionally at least one filler E.

BRIEF DESCRIPTION OF THE DRAWINGS

FIG. 1 represents embodiments as described herein.

DETAILED DESCRIPTION OF A PREFERRED EMBODIMENT

The catalytic composition Y' for polycondensation by dehydrogenative condensation used in accordance with the invention is effective and economical, in particular from the viewpoint of platinum catalysts.

One of the advantages of the dehydrogenative condensation processes as claimed consists in using catalytic compositions Y' comprising at least one carbene which is stable in solution at 20° C.

Preferably, the catalytic composition is composed exclusively of one or more alcohols G and of the polycondensation catalyst A according to the invention The alcohol G will be present in the catalytic composition Y' in a proportion of at least 50% by weight relative to the total weight of said catalytic composition Y', and preferably of at least 55% by weight and even more preferentially in a proportion of at least 60% by weight relative to the total weight of said catalytic composition Y'.

Processes for preparing the catalytic composition Y' (carbenes that are stable in solution in a solvent comprising at least one alcohol G) are described in patent application FR 10 50108. These processes consist in preparing the carbene by deprotonation of a precursor salt using at least one strong base optionally generated in situ, said deprotonation being carried out in a solvent comprising at least one alcohol.

More specifically, a process for preparing a catalytic composition Y' according to the invention comprises the following steps:
  a) at least one strong base, optionally generated in situ, is reacted, preferably at a temperature between 0° C. and 100° C., with at least one carbene precursor compound A' of formula (I), said compound A' being a salt comprising an iminium function of structure (I') below:

(I')

with:
  the symbol X being chosen from the group consisting of the following atoms or groups: —O—, —S—, —N(R)— and —P(R)—, with the symbol R being a $C_1$-$C_{30}$ group,
  the symbols $R^1$, $R^2$ and $R^3$ being identical or different, optionally substituted, $C_1$-$C_{30}$ groups optionally comprising one or more atoms chosen from the group consisting of: S, P, Si, N and O, and
  the symbols X, $R^1$, $R^2$ and $R^3$ taken in pairs can form a 5-, 6- or 7-membered ring;
with the following conditions:
  the strong base is chosen so as to be able to carry out a deprotonation of the hydrogen of the iminium function of structure (I'), and
  the reaction is carried out in a solvent which is an alcohol or an alcohol mixture.

Advantageously, this deprotonation is carried out at room temperature (20° C.).

Preferably, the compound A' is chosen from the compounds of general formula (III) or (III') below:

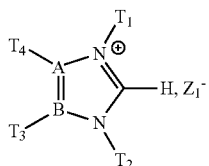

(III)

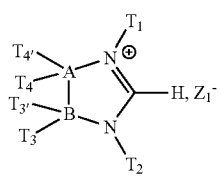

(III')

in which:
the symbols A and B independently represent a carbon or nitrogen atom, it being understood that:
  in formula (III), when the symbol A represents a nitrogen atom, then the symbol $T_4$ is not present, and when the symbol B represents a nitrogen atom, then the symbol $T_3$ is not present;
  in formula (III'), when the symbol A represents a nitrogen atom, then the symbol $T_4$ or $T_{4'}$ is not present, and when the symbol B represents a nitrogen atom, then the symbol $T_3$ or $T_{3'}$ is not present;
the symbols $T_3$, $T_{3'}$, $T_4$ and $T_{4'}$ represent, independently of one another, a hydrogen atom; or one of the following groups: alkyl, cycloalkyl optionally substituted with an alkyl or alkoxy group, aryl optionally substituted with an alkyl or alkoxy group, alkenyl, alkynyl or arylalkyl in which the aryl part is optionally substituted with an alkyl or alkoxy group;
the symbols $T_3$ and $T_4$ can form, together and with A and B, when the latter each represent a carbon atom, an aryl, it being understood that, in this case, $T_{3'}$ and $T_{4'}$ are not present;
the symbols $T_1$ and $T_2$ independently represent:
  1) one of the following groups: alkyl, cycloalkyl optionally substituted with an alkyl, alkyl which is perfluorinated or optionally substituted with a perfluoroalkyl group, cycloalkyl optionally substituted with an alkyl or alkoxy group, aryl optionally substituted with an alkyl or alkoxy group, alkenyl, alkynyl or arylalkyl in which the aryl part is optionally substituted with an alkyl or alkoxy group; or
  2) a monovalent radical of formula (IV) below:

—V1-V2  (IV)

in which:
  the symbol V1 is a saturated or unsaturated, divalent hydrocarbon-based group, preferably a linear or branched $C_1$-$C_{10}$ alkylene, which is optionally substituted,
  the symbol V2 is a monovalent group chosen from the group of the following substituents:
    alkoxy, —OR$^a$ with the symbol R$^a$ corresponding to a hydrogen atom or an alkyl or aryl group;
    silyl, —Si(OR$^b$)$_x$(R$^c$)$_{3-x}$ with the symbol R$^b$ corresponding to a hydrogen atom or an alkyl, silyl or siloxanyl group, the symbol R$^c$ corresponding to an alkyl or aryl group and the symbol x being an integer equal to 0, 1, 2 or 3;
    amine, preferably —N(R$^a$)$_2$ with the symbol R$^a$ corresponding to a hydrogen atom or to an alkyl or aryl group;
  the substituents $T_1$, $T_2$, $T_3$, $T_{3'}$, $T_4$ and $T_{4'}$ can form, in pairs, when they are located on two adjacent ring members in formulae (III) and (III'), a saturated or unsaturated hydrocarbon-based chain,
the symbol $Z_1$ independently represents an anion derived from a Brönsted acid (protic acid) preferably chosen from the group consisting of:
  carboxylic acids of formula G$^o$-COOH in which the symbol G$^o$ represents an alkyl, and advantageously a $C_1$-$C_{22}$ alkyl; an aryl, advantageously a $C_6$-$C_{18}$ aryl, optionally substituted with one or more $C_1$-$C_6$ alkyls;
  sulfonic acids of formula G$^o$-SO$_3$H in which the symbol G$^o$ is as defined above;
  phosphoric acids of formula G$_o$-PO$_3$H in which the symbol G$_o$ is as defined above;
  the following inorganic acids: HF, HCl, HBr, HI, $H_2SO_4$, $H_3PO_4$, $HClO_4$ and $HBF_4$ taken alone or in combination with one another;
  and mixtures thereof.

Regarding the salt (III), the anion $Z_1^-$ is the anion derived from an organic or inorganic Brönsted acid (protic acid). The anion $Z_1^-$ is usually derived from an acid with a pKa of less than 6. Preferably, $Z_1^-$ derives from an acid with a pKa of less than 4, even better still less than 2. The pKa values referred to here are the pKa values of the acids as measured in water.

Examples of acids are carboxylic acids of formula: G$^o$-COOH, in which the symbol G$^o$ represents an alkyl, for example $C_1$ to $C_{22}$ alkyl, group; an aryl, for example $C_6$ to $C_{18}$ aryl, group optionally substituted with one or more alkyls, preferably one or more ($C_1$-$C_6$)alkyls; sulfonic acids of formula: G$^o$-SO$_3$H, in which the symbol G$^o$ is as defined above; and phosphonic acids of formula: G$^o$-PO$_3$H in which the symbol G$^o$ is as defined above; other acids are HF, HCl, HBr, HI, $H_2SO_4$, $H_3PO_4$, $HClO_4$ and $HBF_4$.

Preferred examples of carboxylic acids are acetic acid, benzoic acid and stearic acid. By way of preferred sulfonic acid, mention will be made of benzenesulfonic acid, and by way of preferred phosphonic acid, mention will be made of phenylphosphonic acid.

The anions $Z_1^-$ derived from the acids HCl, HI, $HBF_4$ and $HPF_6$ are more particularly preferred.

Thus, anions $Z_1^-$ that are particularly preferred are the halide anions and tetrafluoroborate and hexafluorophosphate.

Some examples of imidazolium salts are given below.

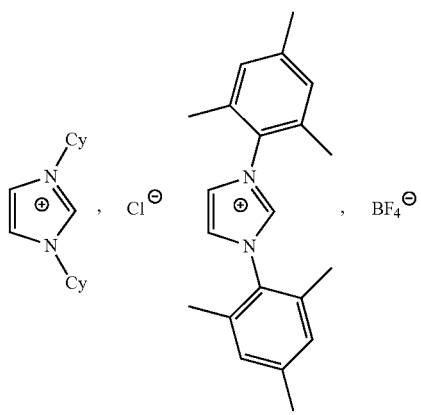

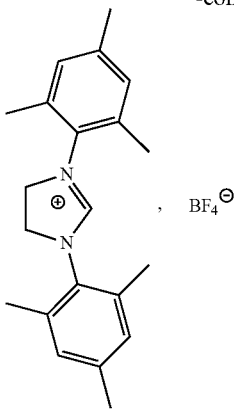

These consumables are either commercially available or are easily prepared by those skilled in the art from commercial compounds.

A method for synthesizing the salts of formula (III) in which A=B=C is described in U.S. Pat. No. 5,077,414.

This process comprises reacting:
⇒ an α-dicarbonylated compound of formula (V) below:

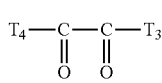

in which the symbols $T_3$ and $T_4$ are as defined above
⇒ with HCHO and two amines of formulae $T_1$-$NH_2$ and $T_2$-$NH_2$, in the presence of an appropriate acid. The symbols $T_1$ and $T_2$ are defined above.

The nature of the anion $Z_1^-$ in the salts of formula (III) depends on the acid used in this step. The acids that can be used are, for example, those listed above and those from which $Z_1^-$ derives.

Other methods for preparing the salts of formula (III) are proposed in Chem. Eur. J. 1996, 2, n° 12, pages 1627-1636 and Angew. Chem. Int. Ed. Engl. 1997, 36, 2162-2187.

The reaction for preparing the carbenes used as catalysts is carried out in a solvent comprising at least one alcohol G or alcohol G mixture so as to obtain carbenes that are stable in an alcohol-based composition or solution.

Preferably, the alcohol G in this solvent corresponds to the formula R°OH, in which R° corresponds to one of the following groups: alkyl, cycloalkyl, aryl, alkenyl, alkynyl, arylalkyl, silyl or siloxane, and preferably the symbol R° is chosen from the group consisting of: a methyl, an ethyl, a propyl and a butyl.

In one preferred embodiment, for the reaction for synthesizing the carbenes in solution, the strong base is chosen from the group of alkali metal or alkaline-earth metal hydroxides, alkoxides, hydrides or amides, preferably from the subgroup comprising: $CH_3ONa$, potassium tert-butylate, KOH, NaOH, $CH_3CH_2OMgOCH_2CH_3$ and mixtures thereof.

According to one eventuality, this strong base can be formed in situ, for example by adding sodium, or sodium hydride, or magnesium to the alcohol under consideration. It is in this way that the alkoxides can be generated in situ.

Advantageously, the deprotonation produces a salt which precipitates and which is separated from the carbene solution, said solution then being usable in the processes of the invention described hereinafter as catalytic composition Y'.

Preferably, the catalytic composition Y' according to the invention comprises a polycondensation catalyst A of formula (II) or (II'):

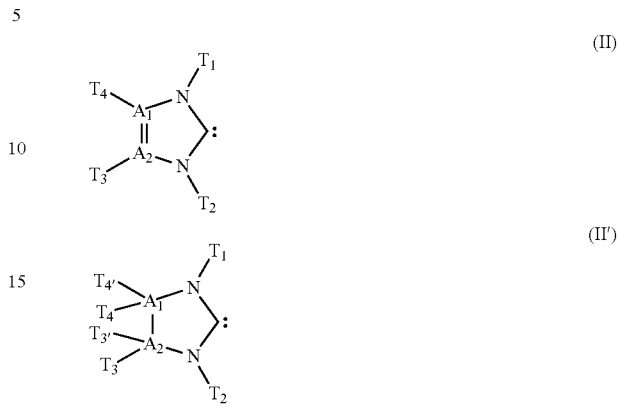

in which:
the symbols $A_1$ and $A_2$ independently represent a carbon or nitrogen atom, it being understood that:
1) in formula (II), when the symbol $A_1$ represents a nitrogen atom, then the symbol $T_4$ is not present, and when the symbol $A_2$ represents a nitrogen atom, then the symbol $T_3$ is not present; and
2) in formula (II'), when the symbol $A_1$ represents a nitrogen atom, then the symbol $T_4$ or $T_{4'}$ is not present, and when the symbol $A_2$ represents a nitrogen atom N, then the symbol $T_3$ or $T_{3'}$ is not present;

the symbols $T_3$, $T_{3'}$, $T_4$ and $T_{4'}$ independently represent a hydrogen atom; or one of the following groups: alkyl, cycloalkyl optionally substituted with an alkyl or alkoxy group, aryl optionally substituted with an alkyl or alkoxy group, alkenyl, alkynyl or arylalkyl in which the aryl part is optionally substituted with an alkyl or alkoxy group;

the symbols $T_3$ and $T_4$ can form, together and with $A_1$ and $A_2$, when the latter each represent a carbon atom, an aryl, it being understood that, in this case, $T_{3'}$ and $T_{4'}$ are not present;

the symbols $T_1$, $T_2$, $T_3$, $T_{3'}$, $T_4$ and $T_{4'}$ can form, in pairs, when they are located on two adjacent ring members in formulae (II) and (II'), a saturated or unsaturated hydrocarbon-based chain, and the symbols $T_1$ and $T_2$ represent, independently of one another:
1) one of the following groups: alkyl, a cycloalkyl optionally substituted with an alkyl group, alkyl which is perfluorinated or optionally substituted with a perfluoroalkyl group, cycloalkyl optionally substituted with an alkyl or alkoxy group, aryl optionally substituted with an alkyl or alkoxy group, alkenyl, alkynyl or arylalkyl in which the aryl part is optionally substituted with an alkyl or alkoxy group; or
2) a monovalent radical of formula (IV) below:

in which:
V1 is a saturated or unsaturated, divalent hydrocarbon-based group, preferably a linear or branched $C_1$-$C_{10}$ alkylene, which is optionally substituted, and
V2 is a monovalent group chosen from the group consisting of the following substituents:
alkoxy, —$OR^a$ with the symbol $R^a$ corresponding to a hydrogen atom or an alkyl or aryl group;

silyl, —Si(OR$^b$)$_x$(R$^c$)$_{3-x}$ with the symbol R$^b$ corresponding to a hydrogen atom or an alkyl, silyl or siloxanyl group, with the symbol R$^c$ corresponding to an alkyl or aryl group and the symbol x being an integer equal to 0, 1, 2 or 3; and amine, preferably —N(R$^a$)$_2$ with the symbol R$^a$ corresponding to a hydrogen atom or to an alkyl or aryl group.

The term "alkyl" denotes a linear or branched, saturated hydrocarbon-based chain, which is optionally substituted (e.g. with one or more alkyls), preferably containing from 1 to 10 carbon atoms, for example from 1 to 8 carbon atoms and even better still from 1 to 7 carbon atoms.

Examples of alkyl groups are in particular methyl, ethyl, isopropyl, n-propyl, tert-butyl, isobutyl, n-butyl, n-pentyl, isoamyl and 1,1-dimethylpropyl. The alkyl part of the alkoxy group is as defined above.

The alkyl group which is perfluorinated or optionally substituted with a perfluoroalkyl group preferably corresponds to the formula:

$$—(CH_2)_p—C_qF_{2q+1}$$

in which the symbol p represents 0, 1, 2, 3 or 4; q is an integer from 1 to 10; and C$_q$F$_{2q+1}$ is linear or branched. Preferred examples of this group are: —(CH$_2$)$_2$—(CF$_2$)—CF$_3$ and —(CF$_2$)—CF$_3$.

The term "aryl" denotes a monocyclic or polycyclic, and preferably monocyclic or bicyclic, aromatic hydrocarbon-based group having from 6 to 18 carbon atoms. It should be understood that, in the context of the invention, the term "polycyclic aromatic group" is intended to mean a group having two or more aromatic rings condensed (orthocondensed or ortho and pericondensed) with one another, i.e. having, in pairs, at least two carbons in common.

Said aromatic hydrocarbon-based ("aryl") group is optionally substituted for example with one or more C$_1$-C$_3$ alkyls, one or more halogenated hydrocarbon-based groups (e.g. CF$_3$), one or more alkoxys (e.g. CH$_3$O) or one or more hydrocarbon-based groups comprising one or more ketone units (e.g. CH$_3$CO—).

By way of example of aryl, mention may be made of phenyl, naphthyl, anthryl and phenanthryl radicals.

The term "arylalkyl" denotes an alkyl group as defined above, substituted with one or more aryl groups on its hydrocarbon-based chain, the aryl group being as defined above. Examples thereof are benzyl and triphenylmethyl.

The term "cycloalkyl" is intended to mean a monocyclic or polycyclic, preferably monocyclic or bicyclic, saturated hydrocarbon-based group preferably having from 3 to 10 carbon atoms and even better still from 3 to 8. The term "polycyclic saturated hydrocarbon-based group" is intended to mean a group having two or more cyclic rings attached to one another via c bonds and/or condensed in pairs. Examples of polycyclic cycloalkyl groups are adamantane and norbornane. Examples of monocyclic cycloalkyl groups are cyclopropyl, cyclobutyl, cyclopentyl, cyclohexyl, cycloheptyl and cyclooctyl.

The term "alkenyl" is intended to mean a substituted or unsubstituted, linear or branched, unsaturated hydrocarbon-based chain having at least one olefinic double bond, and more preferably just one double bond. Preferably, the alkenyl group has from 2 to 8 carbon atoms and even better still from 2 to 6. This hydrocarbon-based chain optionally comprises at least one heteroatom such as O, N or S. Preferred examples of alkenyl groups are allyl and homoallyl groups.

The term "alkynyl" is intended to mean, according to the invention, a substituted or unsubstituted, linear or branched, unsaturated hydrocarbon-based chain having at least one acetylenic triple bond, and more preferably just one triple bond. Preferably, the alkynyl group has from 2 to 8 carbon atoms and even better still from 2 to 6 carbon atoms. By way of example, mention may be made of the acetylenyl group and also the propargyl group. This hydrocarbon-based chain optionally comprises at least one heteroatom such as O, N or S.

According to the invention, the term "silyl" is intended to mean a linear or branched group containing at least one silicon atom. Polydimethylsiloxane chains are examples of silyl groups.

The carbenes of formulae (II) and (II') can have at least two condensed rings, i.e. two groups at least among T$_1$, T$_2$, T$_3$, T$_{3'}$, T$_4$ and T$_{4'}$, located on two adjacent ring members, together form a saturated or unsaturated hydrocarbon-based chain preferably having from 3 to 6 carbon atoms. The term "saturated or unsaturated hydrocarbon-based chain" is intended to mean a linear or branched hydrocarbon-based chain which may or may not have one or more unsaturations of olefinic double bond or acetylenic triple bond type.

As regards the preferred embodiments in formula (II) or (II'), these are embodiments in which A$_1$=A$_2$=carbon atom in formula (II) given above.

Preferred meanings for the symbols T$_1$ and T$_2$ in this formula (II) are:

alkyl, in particular n-propyl, n-pentyl, neopentyl (—CH$_2$—C(CH$_3$)$_3$);

cycloalkyl, in particular cyclopentyl, cyclohexyl or adamantyl;

alkenyl, in particular allyl (—CH$_2$—CH═CH$_2$), methallyl (—CH$_2$—C(CH$_3$)═CH$_2$);

alkynyl, in particular propargyl, homopropargyl (—(CH$_2$)$_2$—C≡CH);

or monovalent group (V) defined above, in particular:

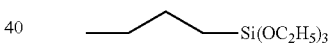

Still in formula (II) and preferably, the symbols T$_3$ and T$_4$ both correspond to hydrogen or together form an aryl and even better still a phenyl.

By way of examples of carbenes, mention may be made of those described in table 2, page 48 of the publication "Bourissou et al. Chem. Rev. 2000, 100, 39-91".

The amount of polycondensation catalyst A according to the invention may be between 0.1% and 10% by weight of the total weight of the composition X according to the invention, and preferably between 0.1% and 5% by weight.

Another subject of the invention consists of the use of at least one catalytic composition Y' according to the invention and as defined in the present application, for dehydrogenative condensation between, on the one hand, at least one organosiloxane monomer, oligomer and/or polymer B having, per molecule, at least one ═SiH reactive unit and, on the other hand, at least one organosiloxane monomer, oligomer and/or polymer C having, per molecule, at least one ═SiOH reactive unit.

Preferentially, the organosiloxane monomers, oligomers and/or polymers B comprising ═SiH reactive units have at least one unit of formula (VIII) and end with units of formula (IX) or are cyclic entities consisting of units of formula (VIII) represented below:

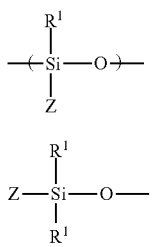

(VIII)

(IX)

in which:

the symbols $R^1$, which may be identical or different, represent:
- a linear or branched alkyl radical containing 1 to 8 carbon atoms, optionally substituted with at least one halogen, preferably fluorine, the alkyl radicals preferably being methyl, ethyl, propyl, octyl and 3,3,3-trifluoropropyl,
- an optionally substituted cycloalkyl radical containing between 5 and 8 cyclic carbon atoms,
- an optionally substituted aryl radical containing between 6 and 12 carbon atoms, or
- an aralkyl part having an alkyl part containing between 5 and 14 carbon atoms and an aryl part containing between 6 and 12 carbon atoms, optionally substituted on the aryl part with halogens, alkyls and/or alkoxyls containing 1 to 3 carbon atoms, the symbols Z are similar or different and represent:
- a hydrogen radical, or
- a group $R^1$ with the condition that there are, per molecule, at least two symbols Z representing a hydrogen atom.

According to one preferential embodiment, the organosiloxane monomers, oligomers and/or polymers C comprising ≡SiOH reactive units have at least one unit of formula (IV) and end with units of formula (V), or are cyclic entities consisting of units of formula (IV) represented below:

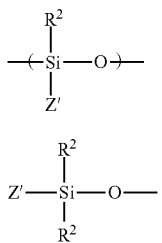

(IV)

(V)

in which:

the symbols $R^2$, which may be identical or different, represent:
- a linear or branched alkyl radical containing 1 to 8 carbon atoms, optionally substituted with at least one halogen, preferably fluorine, the alkyl radicals preferably being methyl, ethyl, propyl, octyl and 3,3,3-trifluoropropyl,
- an optionally substituted cycloalkyl radical containing between 5 and 8 cyclic carbon atoms,
- an optionally substituted aryl radical containing between 6 and 12 carbon atoms, or
- an aralkyl part having an alkyl part containing between 5 and 14 carbon atoms and an aryl part containing between 6 and 12 carbon atoms, optionally substituted on the aryl part with halogens, alkyls and/or alkoxyls containing 1 to 3 carbon atoms, and the symbols Z' are similar or different and represent:
- a hydroxyl group, or
- a group $R^2$ with the condition that, per molecule, at least two symbols Z represent a hydroxyl —OH group.

The species of type B and C can also include in their structure units termed (Q) or (T) defined as indicated hereinafter:

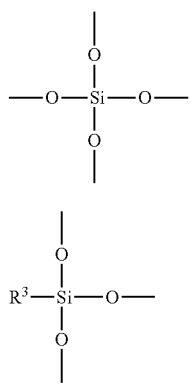

(Q)

(T)

with it being possible for $R^3$ to represent one of the substituents proposed for $R^1$ or $R^2$.

According to one advantageous variant of the invention, the polyorganosiloxanes B used comprise from 1 to 50 siloxyl ≡SiH unit(s) per molecule.

According to one advantageous variant of the invention, the polyorganosiloxanes C used comprise from 1 to 50 siloxyl ≡SiOH unit(s) per molecule.

Particularly preferred as derivatives B are the organosiloxane monomers, oligomers and/or polymers B comprising an ≡SiH reactive unit corresponding to general formula (VI):

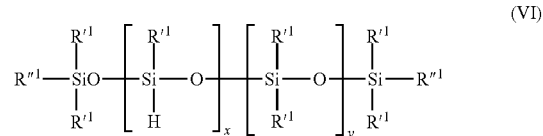

(VI)

in which:

x and y each represent an integer or fractional number ranging between 0 and 200, $R'^1$ and $R''^1$ represent, independently of one another:
- a linear or branched alkyl radical containing 1 to 8 carbon atoms, optionally substituted with at least one halogen, preferably fluorine, the alkyl radicals preferably being methyl, ethyl, propyl, octyl and 3,3,3-trifluoropropyl,
- an optionally substituted cycloalkyl radical containing between 5 and 8 cyclic carbon atoms,
- an optionally substituted aryl radical containing between 6 and 12 carbon atoms, or
- an aralkyl part having an alkyl part containing between 5 and 14 carbon atoms and an aryl part containing between 6 and 12 carbon atoms, optionally substituted on the aryl part, and it being possible for $R''^1$ to also correspond to hydrogen, with the condition according to which the radicals $R''^1$ correspond to hydrogen when x=0.

Particularly preferred as derivatives C are the organosiloxane monomers, oligomers and/or polymers C comprising an ≡SiOH reactive unit corresponding to general formula (VII):

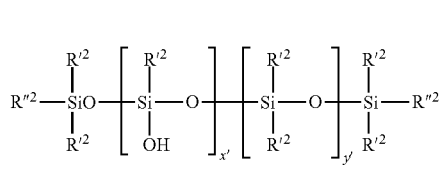
(VII)

in which:
x' and y' each represent an integer or fractional number ranging between 0 and 1200,
$R'^2$ and $R''^2$ represent, independently of one another:
a linear or branched alkyl radical containing 1 to 8 carbon atoms, optionally substituted with at least one halogen, preferably fluorine, the alkyl radicals preferably being methyl, ethyl, propyl, octyl and 3,3,3-trifluoropropyl,
an optionally substituted cycloalkyl radical containing between 5 and 8 cyclic carbon atoms,
an optionally substituted aryl radical containing between 6 and 12 carbon atoms, or
an aralkyl part having an alkyl part containing between 5 and 14 carbon atoms and an aryl part containing between 6 and 12 carbon atoms, optionally substituted on the aryl part,
it being possible for $R''^2$ to also correspond to OH, with the condition according to which the radicals $R''^2$ correspond to OH when x'=0.

The following compounds are quite particularly suitable for the invention as silicone derivatives B:

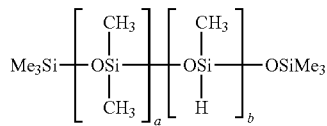
S1

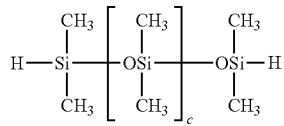
S2

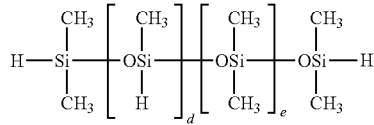
S3 with a, b, c, d and e representing a number ranging from:
in the polymer of formula S1:
0≤a≤150, preferably 0≤a≤100, preferably 0≤a≤20 and
1≤b≤55, preferably 10≤b≤55, preferably 30≤b≤55
in the polymer of formula S2:
0≤c≤15
in the polymer of formula S3:
5≤d≤200, preferably 20≤d≤50
and
2≤e≤50, preferably 10≤e≤30.

The compounds of formula S4 below are quite particularly suitable for the invention as silicone derivatives C:

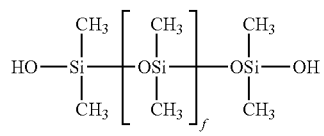
S4 with 1≤f≤1200, preferably 50≤f≤400, and even more preferably 150≤f≤250.

As long as the siloxane species B and C are oligomers or polymers, they can be described as indicated hereinafter.

The polyorganosiloxane B may be linear (e.g. (VII)), branched or cyclic. For economic reasons, its viscosity is preferably less than 100 mPa·s; the organic radicals, which may be identical or different, are preferably methyl, ethyl and/or phenyl. When said polyorganosiloxane B is linear, the hydrogen atoms of the ≡SiH functions are bonded directly to the silicon atoms located at the chain end(s) and/or in the chain.

By way of example of a linear constituent B, mention may be made of polymethylhydrosiloxanes comprising trimethylsiloxyl and/or hydrodimethylsiloxy ends.

Among the cyclic polymers, mention may be made of those corresponding to the following formulae:

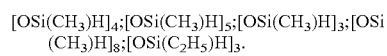

The constituent C can have a viscosity that can reach 200 000 mPa·s. For economic reasons, a constituent of which the viscosity is generally of the order of 20 to 10 000 mPa·s is chosen.

The identical or different organic groups generally present in the constituents C, α,ω-hydroxylated oils or gums, are methyl, ethyl, phenyl and trifluoropropyl radicals. Preferably, at least 80% by number of said organic groups are methyl groups bonded directly to the silicon atoms. In the context of the present invention, α,ω-bis(hydroxy)polydimethylsiloxanes are more especially preferred.

The polyorganosiloxane C may be a resin. The resins C comprising silanol functions have, per molecule, at least one of the units $R'SiO_{1/2}$ (M unit) and $R'^2SiO_{2/2}$ (D unit), in combination with at least one of the units $R'SiO_{3/2}$ (T unit) and $SiO_{4/2}$ (Q unit). The radicals R' generally present are methyl, ethyl, isopropyl, tert-butyl and n-hexyl. As examples of resins, mention may be made of the resins $MQ^{(OH)}$, $MDQ^{(OH)}$, $TD^{(OH)}$ and $MDT^{(OH)}$.

It is possible to use solvents of the polyorganosiloxanes B or C so as to regulate the viscosity of the composition. By way of examples of such conventional solvents of silicone polymers, mention may be made of solvents of aromatic type, such as xylene and toluene, saturated aliphatic solvents, such as hexane, heptane, White-Spirit®, tetrahydrofuran and diethyl ether, and chlorinated solvents, such as methylene chloride and perchloroethylene. In the context of the present invention, a solvent will preferably, however, not be used.

The ≡SiH/≡SiOH molar ratio is advantageously between 1 and 100, preferably between 10 and 50 and even more preferentially between 15 and 45.

The composition according to the invention may also comprise one or more polyorganosiloxanes D. These resins are branched polyorganosiloxane oligomers or polymers which are well known and commercially available. They are present in the form of solutions, preferably siloxane solutions. They have, in their structure, at least two different units chosen from those of formulae:

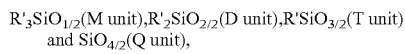

with at least one of these units being a T or Q unit.

The radicals R' are identical or different and are chosen from linear or branched $C_1$-$C_6$ alkyl radicals, $C_2$-$C_4$ alkenyl radicals, phenyl radicals or trifluoro-3,3,3 propyl radicals.

Mention may be made, for example, of: as alkyl radicals R', methyl, ethyl, isopropyl, tert-butyl and n-hexyl radicals, and as alkenyl radicals R, vinyl radicals.

It should be understood that, in the polyorganosiloxane resins D of the abovementioned type, some of the radicals R' are alkenyl radicals.

As examples of branched organopolysiloxane oligomers or polymers D, mention may be made of MQ resins, MDQ resins, TD resins and MDT resins, it being possible for the alkenyl functions to be borne by the M, D and/or T units. As examples of -E- resins which are particularly suitable, mention may be made of vinylated MDQ or MQ resins having a weight content of vinyl groups of between 0.2% and 10% by weight, these vinyl groups being borne by the M and/or D units.

This resin D is advantageously present in a concentration of between 5% and 70% by weight relative to all the constituents of the composition, preferably between 10% and 60% by weight and even more preferentially between 20% and 60% by weight.

The composition according to the invention may also contain a filler E, which is preferably mineral and chosen from siliceous or nonsiliceous materials. When it is a question of siliceous materials, they can act as a reinforcing or semi-reinforcing filler.

The reinforcing siliceous fillers are chosen from colloidal silicas, powders of fumed silica and of precipitated silica, or a mixture thereof.

These powders have an average particle size of generally less than 0.1 μm and a BET specific surface area of greater than 50 $m^2$/g, preferably between 100 and 300 $m^2$/g.

Semi-reinforcing siliceous fillers such as diatomaceous earths or ground quartz may also be used.

As regards the nonsiliceous mineral materials, they may be involved as a semi-reinforcing or bulking mineral filler. Examples of these nonsiliceous fillers that can be used alone or as a mixture are carbon black, titanium dioxide, aluminum oxide, hydrated alumina, expanded vermiculite, zirconium dioxide, zirconate, non-expanded vermiculite, calcium carbonate, zinc oxide, mica, talc, iron oxide, barium sulfate and slaked lime. These fillers have a particle size of generally between 0.001 and 300 μm and a BET surface area of less than 100 $m^2$/g.

In practice, but in a nonlimiting manner, the filler used is a silica.

The filler may be treated using any suitable compatiblizing agent, and in particular hexamethyldisilazane. For further details in this regard, reference may be made, for example, to patent FR-B-2 764 894.

In terms of weight, use is preferably made of an amount of filler of between 5% and 30% and preferably between 7% and 20% by weight relative to all the constituents of the preparation.

Naturally, the composition can be enriched using all types of additives depending on the intended final applications.

In the adhesion-resistance application on flexible supports (paper or polymer film), the composition may comprise an adhesion-adjusting system selected from known systems. This may involve those described in French patent FR-B-2 450 642, U.S. Pat. No. 3,772,247 or European patent application EP-A-0 601 938.

Other functional additives of this composition may be bactericides, photosensitizers, fungicides, corrosion inhibitors, antifreeze agents, wetting agents, antifoams, synthetic latexes, colorants or acidifying agents.

Among the conventional additives, mention may also be made of adhesion promoters, such as, for example, those comprising at least one alkoxylated organosilane, at least one epoxidized organosilicon compound, and at least one metal chelate and/or one metal alkoxide, for example
- vinyltrimethoxysilane or VTMO,
- glycidoxypropyltrimethoxysilane or GLYMO, and
- tert-butyl titanate or TBOT.

This composition may be a solution or an emulsion. In the latter case, it may then comprise at least one surfactant and optionally at least one pH-fixing agent, such as $HCO_3^-$/$CO_3^{2-}$ and/or $H_2PO_4^-$/$HPO_4^{2-}$.

According to another of its aspects, the present invention relates to a process for polymerizing and/or crosslinking a siloxane composition X according to the invention and as defined above, characterized in that a dehydrogenative condensation reaction is carried out between said compounds B and C and in that said dehydrogenative condensation is initiated by the catalytic composition Y' as defined above.

At least two embodiments are possible for the addition of the catalyst.

Said catalyst may, for example, be added to the mixture of the compounds B and C, for example of the polymers of the S1, S2 or S3 type with a polymer of the S4 type, or, preferably, be premixed with the compound C, for example the polymer of the S4 type, before being placed in the presence of the compound B, for example the S1, S2 or S3 polymer.

Regardless of the variant under consideration, the catalyst is preferably used in solution in a solvent comprising at least one alcohol.

Generally, the mixings are carried out with stirring at room temperature.

The solution of catalyst can, for example, be used to prepare a bath with the monomer(s), oligomer(s) and/or polymer(s) to be polymerized and/or crosslinked by dehydrogenative condensation, such that the concentration of the catalyst(s) present is between 0.01% and 5% by weight in said bath, and preferably between 0.05% and 0.5%.

The preparation of the silicone composition according to the invention, which can be used in particular as a coating base for producing coatings with a water-repellent nature, is carried out using means and according to methodologies for mixing that are well known to those skilled in the art, whether compositions with or without solvents, or emulsions, are involved.

The invention also relates to a process for producing at least one coating on a support, preferably a flexible support, characterized in that it consists essentially in applying to this support a siloxane composition X according to the invention and as defined above, and then in allowing the siloxane composition X to crosslink, optionally after heat activation at a temperature of at least 50° C. and preferably between 50° C. and 130° C., for example up to a temperature of at least 110° C., and not exceeding 130° C.

In accordance with this process, the compositions can be applied by means of devices used on industrial machines for coating paper, such as a five-roll coating head, air knife systems or equalizing bar systems, to flexible supports or materials, and then cured by moving through tunnel ovens heated to a temperature of between 50 and 130° C. and for example between 100 and 110° C.

Said compositions can be deposited on any flexible material or substrate, such as paper of various types (supercalendered, coated, glassine), cardboard, cellulose sheets, metal sheets, plastic films (polyester, polyethylene, polypropylene, etc.).

The amounts of compositions deposited are of the order of 0.5 to 2 g per m$^2$ of area to be treated, which corresponds to the deposition of layers of the order of 0.5 to 2 µm.

The materials or supports thus coated can subsequently be brought into contact with any pressure-sensitive rubber, acrylic or other adhesive materials. The adhesive material is then easily detachable from said support or material.

The flexible supports coated with a silicone release film may be, for example:
- an adhesive tape, the internal face of which is coated with a layer of pressure-sensitive adhesive and the external face of which comprises the silicone release coating;
- or a paper or a polymer film for protecting the adhesive face of a self-adhesive or pressure-sensitive adhesive element;
- or a polymer film of the polyvinyl chloride (PVC), polypropylene, polyethylene or polyethylene terephthalate type.

Another subject of the invention relates to a process for producing at least one article made of crosslinked silicone foam, characterized in that it consists essentially in crosslinking a composition as defined above, preferably using organosiloxanes B and C as defined above, under conditions for controlling the reaction enabling the formation of a silicone foam.

The compositions according to the invention are of use in the field of release coatings on paints, the encapsulation of electrical and electronic components, and coatings for textiles, and also in the field of the sheathing of optical fibers.

A subject of the invention is also any coatings obtained by crosslinking and/or polymerizing the siloxane composition X according to the invention and as defined above. These coatings may be of varnish, adhesive coating, release coating and/or ink type.

The invention is also directed toward:
- any articles consisting of a solid material, at least one surface of which is coated with the abovementioned thermally polymerized and/or crosslinked siloxane composition X;
- and also the crosslinked silicone foam obtained by crosslinking an abovementioned siloxane composition X.

EXAMPLES

Example 1

4 g of an α,ω-dihydroxylated polydimethylsiloxane oil having a viscosity of 100 mPa·s are mixed, with magnetic stirring, with 0.2 g MD'$_n$M oil having a viscosity of between 20 and 25 mPa·s. The SiH/SiOH molar ratio is equal to 1.4. 0.05 mmol of carbene NHC-Cy$_2$ [1,3-(dicyclohexyl)imidazolylydene] in the form of an ethanolic solution (40% by weight of carbene NHC-Cy$_2$ in ethanol) is added in one step. In less than one minute, the mixture results in a foam with a volume that is 4 times the initial volume.

The siloxyl unit M=(CH$_3$)SiO$_{1/2}$.

The siloxyl unit D'=(CH$_3$)(H)SiO$_{2/2}$.

The invention claimed is:

1. A siloxane composition X, which can be polymerized or crosslinked by means of dehydrogenative condensation, comprising:
   at least one organosiloxane monomer, oligomer and/or polymer B having, per molecule, at least one ≡SiH reactive unit;
   at least one organosiloxane monomer, oligomer and/or polymer C having, per molecule, at least one SiOH reactive unit;
   a catalytic composition Y' comprising:
   a) a catalytically effective amount of at least one polycondensation catalyst A which is a carbene of formula (I) below:

with:
   the symbol X being chosen from the group consisting of the following atoms or groups: —O—, —S—, —N(R)— and —P(R)— with R being a C$_1$-C$_{30}$ group,
   R$^1$, R$^2$ and R$^3$ being identical or different, optionally substituted, C$_1$-C$_{30}$ groups optionally comprising at least one atom selected from the group consisting of: S, P, Si, N and O, and
   the symbols X, R$^1$, R$^2$ and R$^3$ taken in pairs can form a 5-, 6- or 7-membered ring, and
   b) at least one solvent comprising at least one alcohol G, optionally at least one polyorganosiloxane resin D; and optionally at least one filler E.

2. The siloxane composition X as claimed in claim 1, wherein the catalyst A is of formula (II) or (II'):

in which:
   the symbols A$_1$ and A$_2$ independently represent a carbon or nitrogen atom, it being understood that:
   1) in formula (II), when the symbol A$_1$ represents a nitrogen atom, then the symbol T$_4$ is not present, and when the symbol A$_2$ represents a nitrogen atom, then the symbol T$_3$ is not present; and
   2) in formula (II'), when the symbol A$_1$ represents a nitrogen atom, then the symbol T$_4$ or T$_{4'}$ is not present, and when the symbol A$_2$ represents a nitrogen atom N, then the symbol T$_3$ or T$_{3'}$ is not present;

the symbols $T_3$, $T_{3'}$, $T_4$ and $T_{4'}$ independently represent a hydrogen atom; or one of the following groups: alkyl, cycloalkyl optionally substituted with an alkyl or alkoxy group, aryl optionally substituted with an alkyl or alkoxy group, alkenyl, alkynyl or arylalkyl in which the aryl part is optionally substituted with an alkyl or alkoxy group;

the symbols $T_3$ and $T_4$ can form, together and with $A_1$ and $A_2$, when the latter each represent a carbon atom, an aryl, it being understood that, in this case, $T_{3'}$ and $T_{4'}$ are not present;

the symbols $T_1$, $T_2$, $T_3$, $T_{3'}$, $T_4$ and $T_{4'}$ can form, in pairs, when they are located on two adjacent ring members in formulae (II) and (II'), a saturated or unsaturated hydrocarbon-based chain, and the symbols $T_1$ and $T_2$ represent, independently of one another:

1) one of the following groups: alkyl, a cycloalkyl optionally substituted with an alkyl group, alkyl which is perfluorinated or optionally substituted with a perfluoroalkyl group, cycloalkyl optionally substituted with an alkyl or alkoxy group, aryl optionally substituted with an alkyl or alkoxy group, alkenyl, alkynyl or arylalkyl in which the aryl part is optionally substituted with an alkyl or alkoxy group; or 2) a monovalent radical of formula (IV) below:

$$-V1-V2 \qquad (IV)$$

in which:

V1 is a saturated or unsaturated, divalent hydrocarbon-based group, optionally a linear or branched $C_1$-$C_{10}$ alkylene, which is optionally substituted, and V2 is a monovalent group selected from the group consisting of the following substituents:

alkoxy, —OR$^a$ with the symbol R$^a$ corresponding to a hydrogen atom or an alkyl or aryl group;

silyl, —Si(OR$^b$)$_x$(R$^c$)$_{3-x}$ with the symbol R$^b$ corresponding to a hydrogen atom or an alkyl, silyl or siloxanyl group, with the symbol R$^c$ corresponding to an alkyl or aryl group and the symbol x being an integer equal to 0, 1, 2 or 3; and amine, optionally —N(R$^a$)$_2$ with the symbol R$^a$ corresponding to a hydrogen atom or to an alkyl or aryl group.

3. The composition as claimed in claim 1, wherein the organosiloxane monomer, oligomer and/or polymer C comprising ≡SiOH reactive units have at least one unit of formula (IV) and end with units of formula (V), and/or is a cyclic entity comprising at least one unit of formula (IV) represented below:

in which:

the symbols $R^2$, which may be identical or different, represent:

a linear or branched alkyl radical containing from 1 to 8 carbon atoms, optionally substituted with at least one halogen, optionally fluorine, alkyl radical optionally being methyl, ethyl, propyl, octyl and/or 3,3,3-trifluoropropyl, an optionally substituted cycloalkyl radical comprising from 5 to 8 cyclic carbon atoms, an optionally substituted aryl radical comprising from 6 to 12 carbon atoms, or an aralkyl part having an alkyl part comprising from 5 to 14 carbon atoms and an aryl part comprising from 6 to 12 carbon atoms, optionally substituted on the aryl part with halogen, alkyl and/or alkoxyl comprising from 1 to 3 carbon atoms, and the symbols Z' are similar or different and represent:

a hydroxyl group, or a group $R^2$ with the condition that, per molecule, at least two symbols Z represent a hydroxyl —OH group.

4. The composition as claimed in claim 1, wherein the organosiloxane monomer, oligomer and/or polymer B comprising an ≡SiH reactive unit correspond to formula (VI):

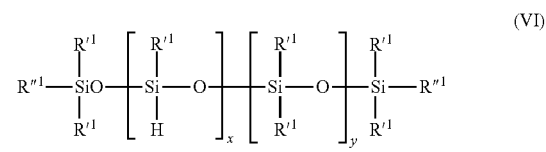

in which:

x and y each represent an integer or fractional number ranging from 0 to 200, $R'^1$ and $R'''^1$ represent, independently of one another:

a linear or branched alkyl radical comprising from 1 to 8 carbon atoms, optionally substituted with at least one halogen, optionally fluorine, alkyl radical optionally being methyl, ethyl, propyl, octyl and/or 3,3,3-trifluoropropyl, an optionally substituted cycloalkyl radical comprising from 5 to 8 cyclic carbon atoms, an optionally substituted aryl radical comprising from 6 to 12 carbon atoms, or an aralkyl part having an alkyl part comprising from 5 to 14 carbon atoms and an aryl part comprising from 6 to 12 carbon atoms, optionally substituted on the aryl part, it being possible for $R'''^1$ to also correspond to hydrogen, with condition according to which radicals $R'''^1$ correspond to hydrogen when x=0.

5. The composition as claimed in claim 1, wherein the organosiloxane monomer, oligomer and/or polymer C comprising an ≡SiOH reactive unit correspond to formula (VII):

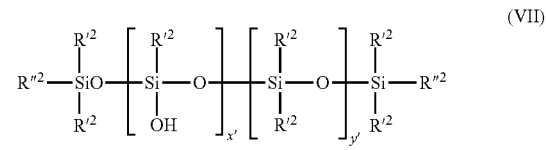

in which:

x' and y' each represent an integer or fractional number ranging from 0 to 1200, $R'^2$ and $R'''^2$ represent, independently of one another:

a linear or branched alkyl radical comprising from 1 to 8 carbon atoms, optionally substituted with at least one halogen, optionally fluorine, alkyl radical optionally being methyl, ethyl, propyl, octyl and/or 3,3,3-trifluoropropyl, an optionally substituted cycloalkyl radical comprising from 5 to 8 cyclic carbon atoms, an optionally substituted aryl radical comprising from 6 to 12 carbon atoms, or an aralkyl part having an alkyl part comprising from 5 to 14 carbon atoms and an aryl part comprising from 6 to 12 carbon atoms, optionally substituted on an aryl part, it being possible for R"² to also correspond to OH, with the condition according to which radicals R"² correspond to OH when x'=0.

6. A process for polymerizing and/or crosslinking a siloxane composition X as defined in claim 1, comprising carrying out a dehydrogenative condensation reaction between said compounds B and C and initiating dehydrogenative condensation by the catalytic composition Y'.

7. A process for producing at least one continuous or discontinuous coating on a support, optionally a flexible support, wherein said process comprises applying to said support a siloxane composition X as defined in claim 1, and then allowing the siloxane composition to crosslink, optionally after heat activation up to a temperature of at least 50° C.

8. A process for producing at least one article made of crosslinked silicone foam, wherein said process comprises crosslinking a siloxane composition X as defined in claim 1, under conditions for controlling a reaction enabling formation of a foam.

9. A coating obtained by crosslinking and/or polymerizing the siloxane composition X as defined in claim 1.

10. An article comprising a solid material, at least one surface of which is coated with a thermally polymerized and/or crosslinked siloxane composition as defined in claim 1.

11. A crosslinked silicone foam obtained by crosslinking a siloxane composition X as defined in claim 1.

12. The composition as claimed in claim 1, wherein the at least one alcohol G is selected from one or more of the group consisting of methanol, ethanol, propanol, and butanol.

13. The composition as claimed in claim 1, comprising said at least one polyorganosiloxane resin D.

14. The composition as claimed in claim 1, comprising said at least one filler E.

15. The composition as claimed in claim 1, wherein the alcohol G is present in the catalytic composition Y' in a proportion of at least 50% by weight relative to the total weight of the catalytic composition Y'.

* * * * *